United States Patent
Kazlauskis et al.

(10) Patent No.: US 11,605,009 B2
(45) Date of Patent: Mar. 14, 2023

(54) NETWORK DEVICE IDENTIFICATION

(71) Applicant: Cujo LLC, El Segundo, CA (US)

(72) Inventors: Evaldas Kazlauskis, Siauliai (LT); Jovaldas Januskevicius, Kaunas (LT)

(73) Assignee: Cujo LLC, Walnut, CA (US)

( * ) Notice: Subject to any disclaimer, the term of this patent is extended or adjusted under 35 U.S.C. 154(b) by 205 days.

(21) Appl. No.: 16/994,952

(22) Filed: Aug. 17, 2020

(65) Prior Publication Data

US 2022/0051113 A1 Feb. 17, 2022

(51) Int. Cl.
| | |
|---|---|
| *G06F 15/173* | (2006.01) |
| *G06N 5/025* | (2023.01) |
| *H04L 41/12* | (2022.01) |
| *H04L 41/16* | (2022.01) |
| *H04L 43/065* | (2022.01) |
| *G06F 18/22* | (2023.01) |

(52) U.S. Cl.
CPC ............. *G06N 5/025* (2013.01); *G06F 18/22* (2023.01); *H04L 41/12* (2013.01); *H04L 41/16* (2013.01); *H04L 43/065* (2013.01)

(58) Field of Classification Search
CPC ...... G06N 5/025; G06K 9/6215; H04L 41/12; H04L 41/16; H04L 43/065
See application file for complete search history.

(56) References Cited

U.S. PATENT DOCUMENTS

| 9,197,498 B2 | 11/2015 | Chambers et al. |
| 2019/0296979 A1 | 9/2019 | Gupta et al. |
| 2020/0076799 A1 * | 3/2020 | Lackey .............. G06F 21/73 |
| 2020/0127892 A1 | 4/2020 | Sevalle et al. |
| 2021/0335505 A1 * | 10/2021 | Tedaldi ............ G06K 9/6282 |

OTHER PUBLICATIONS

Meidan, Yair, et al., "ProfilloT: a machine learning approach for IoT device identification based on network traffic analysis," Proceedings of the Symposium on Applied Computing, http://dx.doi.org/10.1145/3019612.3019878, Apr. 2017, 4 pages.
Miettinen, Markus, et al., "IoT Sentinel: Automated Device-Type Identification for Security Enforcement in IoT," https://arxiv.org/pdf/1611.04880.pdf, 2017 IEEE 37th International Conference on Distributed Computing Systems (ICDCS), IEEE, 2017, 12 pages.
Bezawada, Bruhadeshwar, et al., "Iotsense: Behavioral fingerprinting of iot devices." arXiv preprint arXiv:1804.03852, https://arxiv.org/pdf/1804.03852.pdf, 2018, 11 pages.
Extended European Search Report for EP Patent Application No. 21191033.6, dated Feb. 23, 2022, 7 pages.

* cited by examiner

*Primary Examiner* — Wing F Chan
*Assistant Examiner* — Joseph R Maniwang
(74) *Attorney, Agent, or Firm* — Dority & Manning, P.A.

(57) ABSTRACT

Network device identification. A method includes extracting, from network traffic data of a plurality of user devices in a computer network, one or more data fragments relating to a device model of each user device, associating the one or more data fragments with device identification data assigned to each user device, determining a device model for a specific data fragment based on analyzing one or more data fields associated with the specific data fragment, and generating one or more device model identification rules based on the specific data fragment.

26 Claims, 4 Drawing Sheets

NETWORK DEVICE IDENTIFICATION

TECHNICAL FIELD

The present application relates generally to network security.

BACKGROUND

It can be desirable to identify network devices in a computer network to enable, for example, controlling access to computer networks or services, applying required communication policies, and/or preventing and monitoring unauthorized access.

SUMMARY

According to an aspect of the invention there is provided a method as specified in claim 1.

According to other aspect of the invention, there is provided an apparatus in a computer network system as specified in claim 11.

According to other aspect of the invention, there is provided a non-transitory computer-readable medium comprising stored program code, the program code comprised of computer-executable instructions that, when executed by a processor, causes the processor to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

It can be desirable to identify network devices in a computer network to enable, for example, controlling access to computer networks or services, applying required communication policies, and/or preventing and monitoring unauthorized access.

Identifying new device models, device types and/or creating device identification rules based on network data currently requires manual work from analysts. This becomes a bottleneck when there are millions of devices in the network as identification of devices is labor intensive work.

Thus, there is a need for automated techniques for identifying new devices in computer networks.

Figure 1:
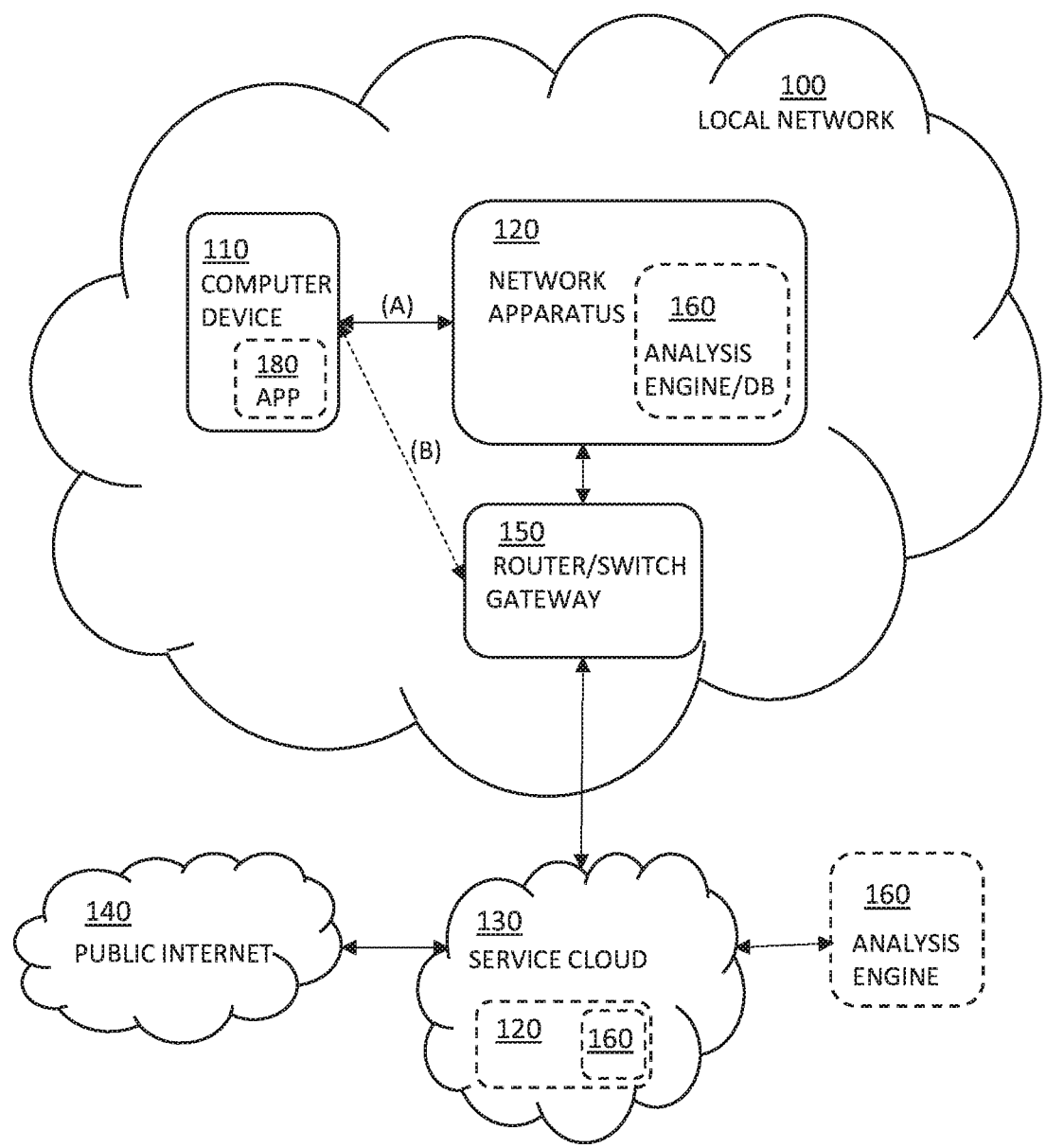
FIG. 1 illustrates an example system environment for a network apparatus in a computer network system.

FIG. 1 illustrates schematically an example of a system environment for a network apparatus 120. The system environment illustrated in FIG. 1 includes a computer network 100, such as a local network, that may include one or more computer devices 110, the network apparatus 120, a local router/switch 150, and an analysis engine and a database 160. The computer devices 110 may also comprise any number of client applications 180; however, this is not required. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smart phone, a laptop, or a tablet having a network interface and an ability to connect to the network apparatus 120 and/or the local network router 150 with it. The network apparatus 120 collects information e.g. about the computer network 100, including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g. via an Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the Internet 140 or computer network 100. In some embodiments, the device 110 executes an application (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. At least part of these devices are connected to the Internet 140, for example, via one or more Wi-Fi access points.

Known device identification methods focus for identifying specific device types from data acquired, for example, from Transmission Control Protocol (TCP) packets and/or building/training machine learning models for each device type separately.

Embodiments of the present invention overcome the drawbacks of the previous solutions by applying new capabilities and methods targeted to enable identification of devices based on different types of network information and enable also exact device model identification. Further, embodiments of the present invention not only identify device types but can also identify device brands and specific device models. Further, embodiments of the present invention do not require generating separate machine learning models/systems for each device type but only one machine learning model/system is able to identify all device types. The embodiments of the present invention propose an automated way to identify new device models in a computer network by intelligently aggregating network data and reusing identification rules to generate new ones by retaining complex identification logic.

Figure 2:
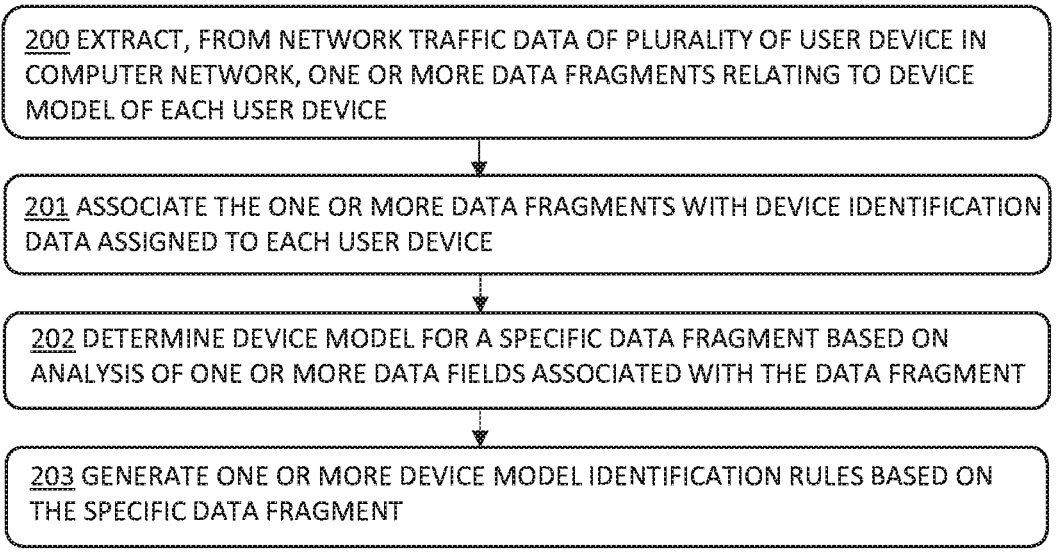
FIG. 2 illustrates an example method, according to one embodiment.

FIG. 2 is a flow diagram illustrating an embodiment of a method.

In 200, one or more data fragments relating to a device model of each user device are extracted from network traffic data of a plurality of user devices in a computer network.

In 201, the one or more data fragments are associated with device identification data assigned to each user device.

In 202, a device model is determined for a specific data fragment of the one or more data fragments based on analyzing one or more data fields associated with the specific data fragment.

In 203, one or more device model identification rules are generated based on the specific data fragment.

In an embodiment, the one or more data fragments relating to the device model are extracted by analysis using one or more of: static rules, data extraction algorithms, and artificial intelligence applications.

In an embodiment, determining the device model for the specific data fragment based on analyzing one or more data fields associated with the specific data fragment further comprises analyzing historical device model data and applying one or more of: statistical analysis, encoded decision rules, or one or more artificial intelligence techniques.

In an embodiment, one or more of: a brand of the user device, a type of the user device, a name of the user device, an operating system of the user device, and concreteness of a keyword formed based on a data source type and the extracted data fragment are analyzed when determining the device model.

In an embodiment, the step of generating the one or more device model identification rules further comprises: selecting one or more further data fragments that are most similar when compared with the specific data fragment as one or more device model identification rule candidates; constructing a rule graph for each device model identification rule candidate; splitting each part of the device model identification rule candidate into separate nodes in the rule graph; generating a comparison by comparing each node with the specific data fragment; calculating a matching level for each node based on the comparison; and accepting or rejecting each device model identification rule candidate based on the matching level. In an embodiment, selecting the one or more further data fragments as one or more device model identification rule candidates is based on comparing the one or more further data fragments with the specific data fragment. The one or more further data fragments that are determined to have the highest matching levels with the specific data fragment are selected as the one or more device model identification rule candidates.

In an embodiment, in response to determining that all parts of the specific data fragment are matched with at least one node in the rule graph, a reverse identification rule is calculated by replacing the matched parts of the device model identification rule candidate with the parts of the specific data fragment having the highest matching levels; and in response to determining that one or more nodes are not matched or that the one or more nodes have a lower matching level, the nodes are dropped from the one or more device model identification rules.

In an embodiment, it is further determined whether the device model identification rule candidate matches the specific data fragment and in response to determining that the device model identification rule candidate matches the specific data fragment, the device model identification rule candidate is marked as successfully generated device model identification rule; and in response to determining that the device model identification rule candidate does not match the specific data fragment, the specific data fragment is selected as a device model identification rule.

In an embodiment, the method further comprises extracting metadata related to determining the device model and to generating the one or more device model identification rules; and assigning a device model identification accuracy score to the device model and to each device model identification rule based on the extracted metadata, wherein the device model identification accuracy score is determined by using one or more of: decision rules, statistical analysis and artificial intelligence techniques.

In an embodiment, the metadata comprises one or more of: a ratio of most common brand, device type, device identification level and/or operating system among user devices transmitting the specific data fragment, acceptance/rejection of the one or more device model identification rules, complexity of the one or more device model identification rules, similarity of the one or more device model identification rules when compared with the specific data fragment.

Figure 3:
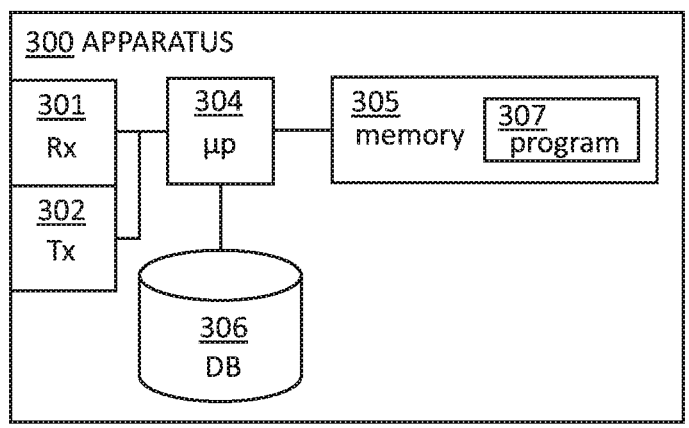
FIG. 3 is a block diagram of an apparatus, according to one embodiment.

Turning now to FIG. 3 that is showing an example of a network apparatus such as a router, a switch, a 5G modem, or other network level apparatus.

A processor 304 is provided that is configured to identify devices in the monitored computer network. The processor 304 is configured to extract, from network traffic data of a plurality of user devices in a computer network, one or more data fragments relating to a device model of each user device. The processor 304 is further configured to associate the one or more data fragments with device identification data assigned to each user device and to determine a device model for a specific data fragment of the one or more data fragments based on analyzing one or more data fields associated with the specific data fragment. The processor 304 is further configured to generate one or more device model identification rules based on the specific data fragment.

In an embodiment, the processor 304 is configured to store data such as any network-based identification data, metadata, attributes, values, MAC addresses, hostnames as well as other data related to connection requests, state information and/or domain data to the database 306. The database 306 is shown in this example as being located at the apparatus 300, but it will be appreciated that the apparatus 300 may alternatively access a remote database. The database 306 may comprise necessary data collected from user devices.

The apparatus 300 is provided with a receiver 301 that receives the connection requests and responses. A transmitter 302 is also provided for communication with the computer device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processor.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all the functions of the method can be implemented in any apparatus, for example any user device or a server.

Figure 4:
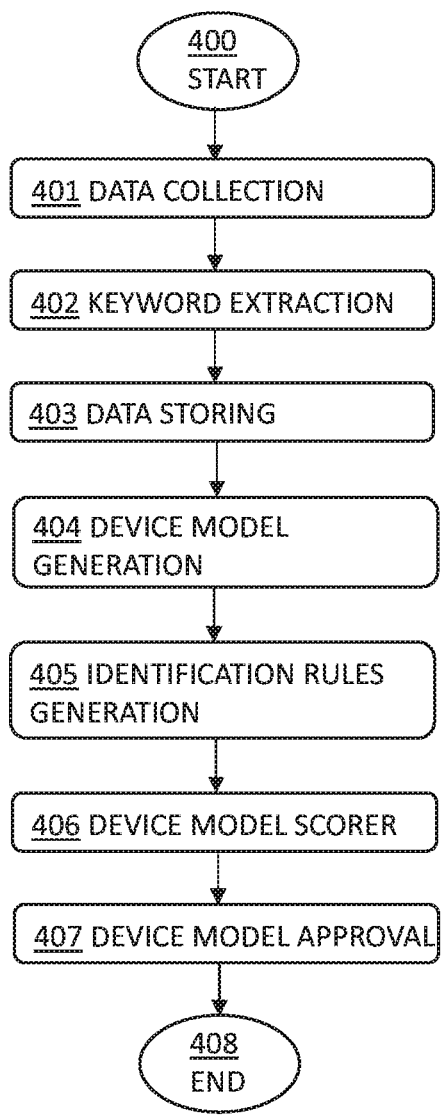
FIG. 4 a flow diagram illustrating a process according to one embodiment.

FIG. 4 is a flow diagram illustrating a process according to one embodiment. The method starts in 400. In 401, network data is collected from user devices for example from customer-premises equipment and then sent to the network cloud where it can be stored and paired with a unique device identifier which may be generated by a service provider. The data may be analyzed by the system to gather information and data relations.

An example of the collected data (User-Agent) is shown below:
server-bag (iPhone OS,13.5.1., 17F80,iPhone11,6

In 402, the collected network data is analyzed for example by using static rules, data extraction algorithms and artificial intelligence applications. The purpose of this step is to extract data fragments that may belong to a particular device model.

Following the above example data:
server-bag (iPhone OS,13.5.1., 17F80,iPhone11,6,
where the bolded text is identified as being potentially descriptive data referring to a specific device model. In this example use case, a deep artificial neural network is used to read the example data word by word and based on textual context (surrounding words) the decision on whether the term indicates a device model or not is calculated for each element. In an embodiment, only terms that indicate the device model are extracted for further use.

In 403, the extracted data fragments are stored in a database with a respective unique device identifier.

Table 1 describes an example of stored data where key-value data storage is used according to an embodiment.

TABLE 1

| Use case example of key-value data storage | |
|---|---|
| Key | Value |
| USER_AGENT_iPhone11,6 | device_11111 |
| | device_12233 |
| | . . . |

In the example case related to Table 1, the key is formed of a data source type and extracted data fragment and a set of unique device identifiers sending this specific data fragment are stored as a value.

In 404, a device model generation process is initiated when the number of collected, unique device identifiers reaches a predetermined threshold for a specific extracted data fragment. The purpose of this step is to estimate multiple fields associated to the data fragment. These fields may comprise (but are not limited to) one or more of: a device type, a device brand, a specific device model, an operating system, a device model identification concreteness (level). The estimation may be made by analyzing historical device model data and applying, for example, statistical analysis, encoded decision rules and/or applying other artificial intelligence techniques.

Table 2 describes an example of the new generated device model proposal that is based on a specific data fragment and a set of device identifiers of the above example data.

TABLE 2

| Use case example of device model input and output data | | |
|---|---|---|
| | Input | Output |
| Keyword: | iPhone11,6 | Type: Phone |
| Devices: | device_11111 | Brand: Apple |
| | device_12233 | Name: Apple iPhone XS Max |
| | . . . | Level: 10 |
| | | Operating system: iOS |

In 405, when a device model for a specific data fragment has been generated, also identification rules are generated. One or more identification rules are selected from a database that are most similar to the data fragment. The similarity may be measured by comparing how many bytes should be changed until the extracted data fragments would be equal to an identification rule from database. In an embodiment, one or more rules are selected that are most similar to the data fragment. In an embodiment, selecting the one or more further data fragments as one or more device model identification rule candidates may be based on comparing the one or more further data fragments with the specific data fragment. Further, one or more further data fragments that are determined to have the highest matching levels with the specific data fragment are selected as the one or more device model identification rule candidates.

Figure 5:
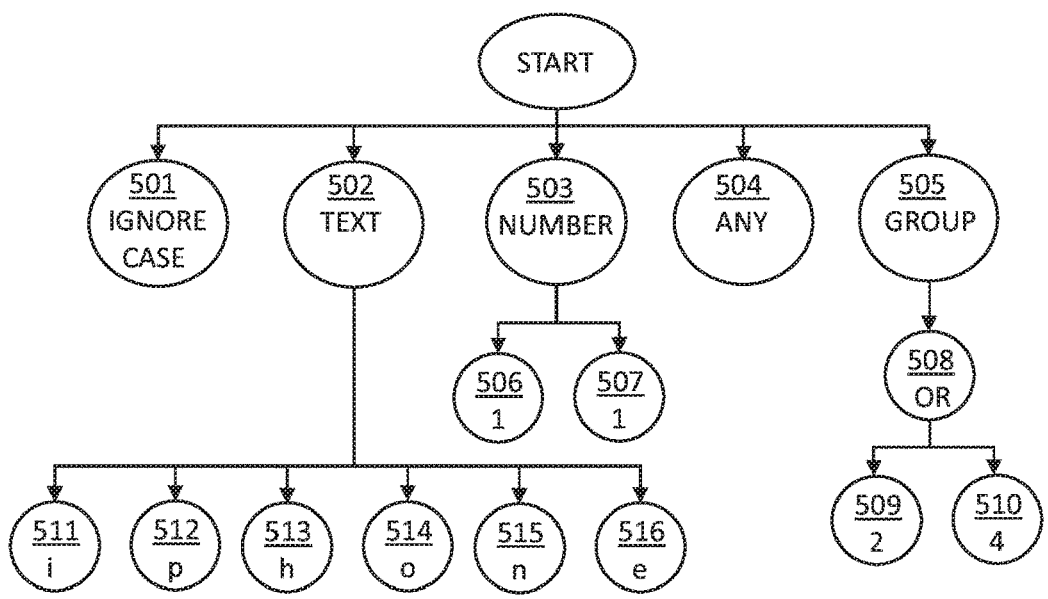
FIG. 5 is a use case example illustrating an embodiment.

In an embodiment, a structured rule graph may be constructed for each rule. FIG. 5 shows an example of a rule graph. Special symbols and/or each part in the identification rules are split in separate nodes. Each node in the rule graph is compared with the data fragments and a matching level is computed. Once all parts of the data fragments are matched with at least one node in the rule graph, a reverse identification rule is computed. This may be done by replacing the matched parts from the identification rule to the parts of the data fragments that have the highest matching level. If some nodes are not matched or have lower matching levels and were not selected, then they may be dropped from the generated identification rule. After the reverse identification rule has been generated, a check is performed on whether the rule matches the data fragment. If it does match, then the rule is marked as successfully generated and may be used in further steps. Otherwise, the original data fragment is selected as an identification rule.

In an embodiment, when one or more identification rules have been generated by the process described above or using other decision rules, then they can be passed on to the next step of the process.

When continuing with the example data fragment above, iPhone11,6 (Keyword), and the most similar rule from the database, (i?)iPhone11.(2|4) (Most similar rule), each node 501-516 is matched against the data fragment. The matching parts (502-504, 506, 507, 511-516) are kept, and mismatching parts (505, 508-510) are replaced with missing elements. In this example use case, the part from the rule (2|4) or noted in a graph as GROUP→OR→2|4 is replaced with the number 6. (i?) is a special symbol in this example, which means that it does not matter if the text is lower or uppercase. Thus, it can be ignored (node 501). Once full matching is done and all mismatched cases resolved, the output rule is generated. The output in this use case example is: (i?) iPhone11.6 rule which matches the original data fragment.

In 406, the accuracy of the whole process is evaluated by a device model scorer after the device model and identification rules have been generated. Each process produces statistics and other metadata on how well the model generation process was performed. Examples (not limiting) of the extracted metadata include data related to device model generation and identification rules generation, such as a ratio of the top picked brand, top picked device type, top picked device identification level and/or top picked operating system among devices sending the specific data fragment, and data relating to whether the rule was generated or whether an existing rule was used, whether the rule has a complex logic or not (regex/non-regex) and how similar was the rule to the data fragment from which a new rule was generated.

In an embodiment, using this information, a score may be assigned to the generated device model and identification rules. The score may be determined by using decision rules, statistical analysis or applying artificial intelligence where input to the system is the extracted metadata described above. In an embodiment, the score is in a predetermined range where lowest value represents that the generation process was quite unsuccessful. The highest value represents that each estimated value is accurate and estimated correctly.

Figure 6:
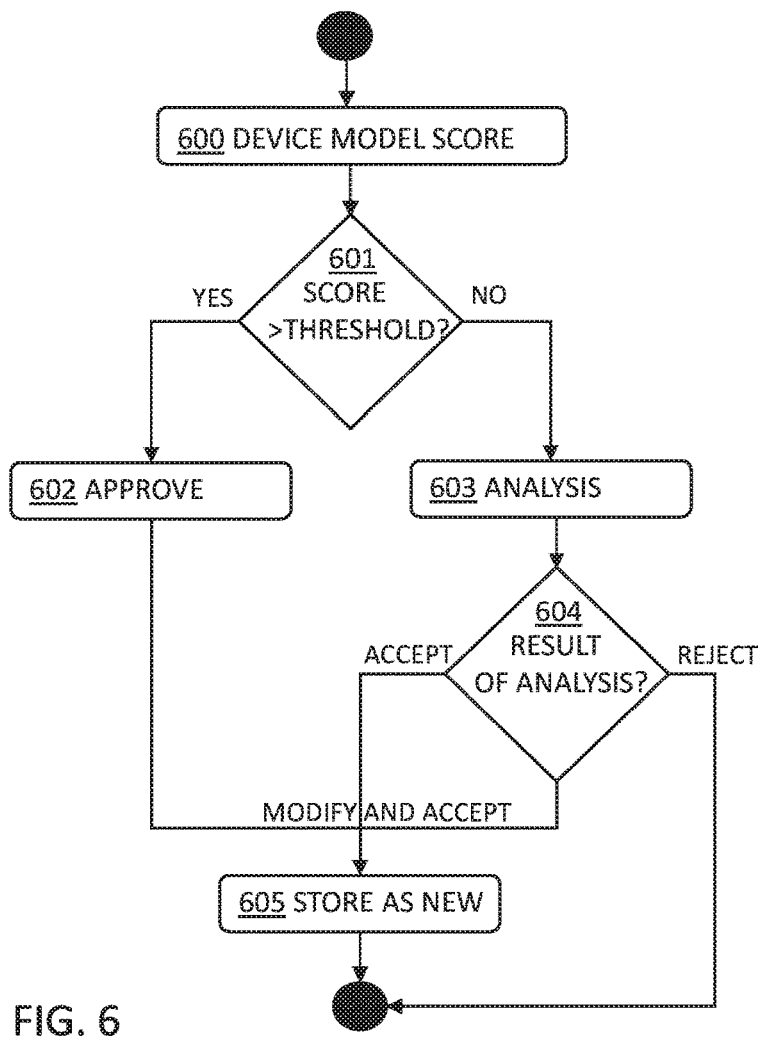
FIG. 6 illustrates an example use case process flow according to an embodiment.

In 407, the device model is approved. FIG. 6 shows an example of the model approval scheme. In 600, the device model score is determined. In 601, it is determined whether the score exceeds a predetermined threshold, and if yes, then 602 is entered where the model is approved. In case in 601, the score is below the predetermined threshold, then 603 is entered where further analysis is performed on the data. The analysis can be made automatically or by a human analyst, for example. In 604, depending on the result of the analysis, the data may be accepted, rejected or accepted after modifications, for example. If the data is accepted after 604, then the generated data may be stored as newly created device model description in 605.

It will be appreciated that various modifications may be made to the above described embodiments without departing from the scope of the present invention. For example, the database or analysis engine may be in separate entities to the apparatus, in which case the apparatus will send queries remotely to the analysis engine.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for extracting, from network traffic data of a plurality of user devices in a computer network, one or more data fragments relating to a device model of each user device; a code for associating the one or more data fragments with a device identification data assigned to each user device; a code for determining a device model for a specific data fragment of the one or more data fragments based on analyzing one or more data fields associated with the specific data fragment; and a code for generating one or more device model identification rules based on the specific data fragment.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    extracting, from network traffic data of a plurality of user devices in a computer network, one or more data fragments relating to a device model of each user device;
    associating the one or more data fragments with device identification data assigned to each user device;
    determining a device model for a specific data fragment of the one or more data fragments based on analyzing one or more data fields associated with the specific data fragment; and
    generating one or more device model identification rules based on the specific data fragment.

2. The method according to claim 1, further comprising extracting the one or more data fragments relating to the device model by analysis using one or more of:
    static rules, data extraction algorithms, and artificial intelligence applications.

3. The method according to claim 1, wherein determining the device model for the specific data fragment based on analyzing the one or more data fields associated with the specific data fragment further comprises analyzing historical device model data and applying one or more of:
statistical analysis, encoded decision rules, and one or more artificial intelligence techniques.

4. The method according to claim 3, wherein determining the device model for the specific data fragment further comprises analyzing one or more of:
a brand of the user device, a type of the user device, a name of the user device, an operating system of the user device, and concreteness of a keyword formed based on a data source type and the one or more data fragments.

5. The method according to claim 1, wherein generating the one or more device model identification rules further comprises:
selecting one or more further data fragments as one or more device model identification rule candidates based on comparing the one or more further data fragments with the specific data fragment, wherein the one or more further data fragments that are determined to have the highest matching levels with the specific data fragment are selected;
constructing a rule graph for each device model identification rule candidate;
splitting each part of the device model identification rule candidate into separate nodes in the rule graph;
generating a comparison by comparing each node with the specific data fragment;
calculating a matching level for each node based on the comparison; and
accepting or rejecting each device model identification rule candidate based on the matching level.

6. The method according to claim 5, further comprising:
in response to determining that all parts of the specific data fragment are matched with at least one node in the rule graph, calculating a reverse identification rule by replacing the matched parts of the device model identification rule candidate with the parts of the specific data fragment having the highest matching levels; and
in response to determining that one or more nodes are not matched or that the one or more nodes have a lower matching level, dropping the nodes from the one or more device model identification rules.

7. The method according to claim 5, further comprising:
determining whether the device model identification rule candidate matches the specific data fragment;
in response to determining that the device model identification rule candidate matches the specific data fragment, marking the device model identification rule candidate as successfully generated device model identification rule; and
in response to determining that the device model identification rule candidate does not match the specific data fragment, selecting the specific data fragment as a device model identification rule.

8. The method according to claim 1, further comprising:
extracting metadata related to determining the device model and to generating the one or more device model identification rules; and
assigning a device model identification accuracy score to the device model and to each device model identification rule based on the extracted metadata, wherein the device model identification accuracy score is determined by using one or more of:
decision rules, statistical analysis and artificial intelligence techniques.

9. The method according to claim 8, wherein the metadata comprises one or more of:

a ratio of most common brand, device type, device identification level and/or operating system among user devices transmitting the specific data fragment, acceptance/rejection of the one or more device model identification rules, complexity of the one or more device model identification rules, and similarity of the one or more device model identification rules when compared with the specific data fragment.

10. The method according to claim 8, further comprising:
in response to determining that the device model identification accuracy score is above a predetermined threshold, accepting the device model; and
in response to determining that the device model identification accuracy score is below the predetermined threshold, rejecting the device model.

11. An apparatus in a computer network system comprising:
one or more processors; and
a non-transitory computer-readable medium comprising stored program code, the program code comprising computer-executable instructions that, when executed by the one or more processors, causes the one or more processors to:
extract, from network traffic data of a plurality of user devices in a computer network, one or more data fragments relating to a device model of each user device;
associate the one or more data fragments with device identification data assigned to each user device;
determine a device model for a specific data fragment of the one or more data fragments based on analyzing one or more data fields associated with the specific data fragment;
generate one or more device model identification rules based on the specific data fragment;
extract metadata related to determining the device model and to generating the one or more device model identification rules; and
assign a device model identification accuracy score to the device model and to each device model identification rule based on the extracted metadata.

12. The apparatus according to claim 11, wherein the instructions further cause the one or more processors to determine the device model for the specific data fragment based on analyzing one or more data fields associated with the specific data fragment by analyzing historical device model data and applying one or more of:
statistical analysis, encoded decision rules, and one or more artificial intelligence techniques.

13. The apparatus according to claim 12, wherein, to determine the device model for the specific data fragment, the instructions further cause the one or more processors to analyze one or more of:
a brand of the user device, a type of the user device, a name of the user device, an operating system of the user device, and concreteness of a keyword formed based on a data source type and the one or more data fragments.

14. The apparatus according to claim 11, wherein, to generate the one or more device model identification rules, the instructions further cause the one or more processors to:
select one or more further data fragments as one or more device model identification rule candidates based on comparing the one or more further data fragments with the specific data fragment, wherein the one or more further data fragments that are determined to have the highest matching levels with the specific data fragment are selected;

construct a rule graph for each device model identification rule candidate;
split each part of the device model identification rule candidate into separate nodes in the rule graph;
generate a comparison by comparing each node with the specific data fragment;
calculate a matching level for each node based on the comparison; and
accept or reject each device model identification rule candidate based on the matching level.

15. The apparatus according to claim 14, wherein the instructions further cause the one or more processors to:
calculate a reverse identification rule by replacing the matched parts of the device model identification rule candidate with the parts of the specific data fragment having the highest matching levels in response to determining that all parts of the specific data fragment are matched with at least one node in the rule graph; and
drop the nodes from the one or more device identification rules in response to determining that one or more nodes are not matched or that the one or more nodes have a lower matching level.

16. The apparatus according to claim 14, wherein the instructions further cause the one or more processors to:
determine whether the device model identification rule candidate matches the specific data fragment;
mark the device model identification rule candidate as successfully generated device model identification rule in response to determining that the device model identification rule candidate matches the specific data fragment; and
select the specific data fragment as a device model identification rule in response to determining that the device model identification rule candidate does not match the specific data fragment.

17. The apparatus according to claim 11, wherein:
the device model identification accuracy score is determined by using one or more of:
decision rules, statistical analysis and artificial intelligence techniques.

18. The apparatus according to claim 11, wherein the metadata comprises one or more of:
a ratio of most common brand, device type, device identification level and/or operating system among user devices transmitting the specific data fragment, acceptance/rejection of the one or more device model identification rules, complexity of the one or more device model identification rules, and similarity of the one or more device identification rules when compared with the specific data fragment.

19. The apparatus according to claim 11, wherein the instructions further cause the one or more processors to:
accept the device model in response to determining that the device model identification accuracy score is above a predetermined threshold; and
reject the device model in response to determining that the device model identification accuracy score is below the predetermined threshold.

20. A non-transitory computer-readable medium comprising stored program code, the program code comprising computer-executable instructions that, when executed by a processor, causes the processor to:
extract, from network traffic data of a plurality of user devices in a computer network, one or more data fragments relating to a device model of each user device;
associate the one or more data fragments with device identification data assigned to each user device;
determine a device model for a specific data fragment of the one or more data fragments based on analyzing one or more data fields associated with the specific data fragment;
select one or more further data fragments as one or more device model identification rule candidates based on comparing the one or more further data fragments with the specific data fragment, wherein the one or more further data fragments that are determined to have the highest matching levels with the specific data fragment are selected;
construct a rule graph for each device model identification rule candidate to generate one or more rule graphs; and
generate one or more device model identification rules based on the specific data fragment and the one or more rule graphs.

21. An apparatus in a computer network system comprising:
one or more processors; and
a non-transitory computer-readable medium comprising stored program code, the program code comprising computer-executable instructions that, when executed by the one or more processors, causes the one or more processors to:
extract, from network traffic data of a plurality of user devices in a computer network, one or more data fragments relating to a device model of each user device;
associate the one or more data fragments with device identification data assigned to each user device;
determine a device model for a specific data fragment of the one or more data fragments based on analyzing one or more data fields associated with the specific data fragment; and
generate one or more device model identification rules based on the specific data fragment.

22. A non-transitory computer-readable medium comprising stored program code, the program code comprising computer-executable instructions that, when executed by a processor, causes the processor to:
extract, from network traffic data of a plurality of user devices in a computer network, one or more data fragments relating to a device model of each user device;
associate the one or more data fragments with device identification data assigned to each user device;
determine a device model for a specific data fragment of the one or more data fragments based on analyzing one or more data fields associated with the specific data fragment; and
generate one or more device model identification rules based on the specific data fragment.

23. A method comprising:
extracting, from network traffic data of a plurality of user devices in a computer network, one or more data fragments relating to a device model of each user device;
associating the one or more data fragments with device identification data assigned to each user device;
determining a device model for a specific data fragment of the one or more data fragments based on analyzing one or more data fields associated with the specific data fragment;
generating one or more device model identification rules based on the specific data fragment;

extracting metadata related to determining the device model and to generating the one or more device model identification rules; and assigning a device model identification accuracy score to the device model and to each device model identification rule based on the extracted metadata.

24. A non-transitory computer-readable medium comprising stored program code, the program code comprising computer-executable instructions that, when executed by a processor, causes the processor to:

extract, from network traffic data of a plurality of user devices in a computer network, one or more data fragments relating to a device model of each user device;

associate the one or more data fragments with device identification data assigned to each user device;

determine a device model for a specific data fragment of the one or more data fragments based on analyzing one or more data fields associated with the specific data fragment;

generate one or more device model identification rules based on the specific data fragment;

extract metadata related to determining the device model and to generating the one or more device model identification rules; and assign a device model identification accuracy score to the device model and to each device model identification rule based on the extracted metadata.

25. A method comprising:

extracting, from network traffic data of a plurality of user devices in a computer network, one or more data fragments relating to a device model of each user device;

associating the one or more data fragments with device identification data assigned to each user device;

determining a device model for a specific data fragment of the one or more data fragments based on analyzing one or more data fields associated with the specific data fragment;

selecting one or more further data fragments as one or more device model identification rule candidates based on comparing the one or more further data fragments with the specific data fragment, wherein the one or more further data fragments that are determined to have the highest matching levels with the specific data fragment are selected;

constructing a rule graph for each device model identification rule candidate to generate one or more rule graphs; and generating one or more device model identification rules based on the specific data fragment and the one or more rule graphs.

26. An apparatus in a computer network system comprising:

one or more processors; and a non-transitory computer-readable medium comprising stored program code, the program code comprising computer-executable instructions that, when executed by the one or more processors, causes the one or more processors to:

extract, from network traffic data of a plurality of user devices in a computer network, one or more data fragments relating to a device model of each user device;

associate the one or more data fragments with device identification data assigned to each user device;

determine a device model for a specific data fragment of the one or more data fragments based on analyzing one or more data fields associated with the specific data fragment;

select one or more further data fragments as one or more device model identification rule candidates based on comparing the one or more further data fragments with the specific data fragment, wherein the one or more further data fragments that are determined to have the highest matching levels with the specific data fragment are selected;

construct a rule graph for each device model identification rule candidate to generate one or more rule graphs; and generate one or more device model identification rules based on the specific data fragment and the one or more rule graphs.

* * * * *